United States Patent [19]

Togstad

[11] 4,356,910

[45] Nov. 2, 1982

[54] EXTENDABLE AUGER

[76] Inventor: Frank A. Togstad, 452 Norfolk Way NW., Calgary, Alberta, Canada, T2K 5R1

[21] Appl. No.: 116,086

[22] Filed: Jan. 28, 1980

[51] Int. Cl.³ .................. B65G 33/26; B65G 33/32
[52] U.S. Cl. .................... 198/660; 198/666
[58] Field of Search ................ 198/660, 778, 666

[56] References Cited

U.S. PATENT DOCUMENTS 2,290,806 7/1942 Hodgin .................... 198/666
2,845,167 7/1958 Heiken .................... 198/660
4,014,431 3/1977 Angelitti et al. ............ 198/660

Primary Examiner—Robert B. Reeves
Assistant Examiner—Brian Bond
Attorney, Agent, or Firm—McLaws & Company

[57] ABSTRACT

An extensible grain auger includes a casing defined by co-axial telescoping sections, with an inlet at one end and an outlet at the other end of the casing, a pair of inter-connected auger tubes rotatably mounted in the casing, the flight of one tube being threadable into the auger flight of the other tube; and an extension tube and screw assembly rotatably mounted in the auger tubes, the extension tube extending out of the casing at one end and the screw being connected to a nut in the tube and to the other end of the casing, so that one casing section can be extended and retracted relative to the other casing section.

5 Claims, 3 Drawing Figures

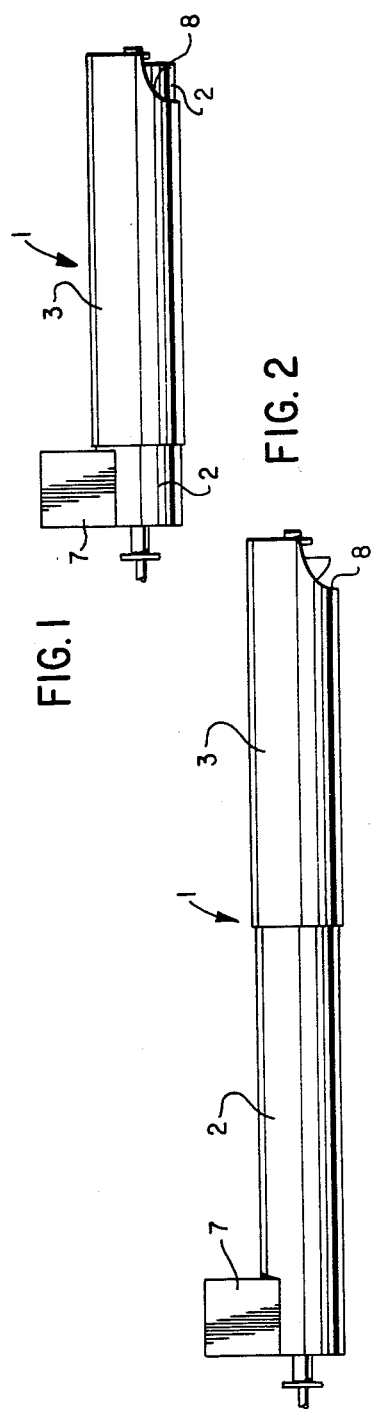
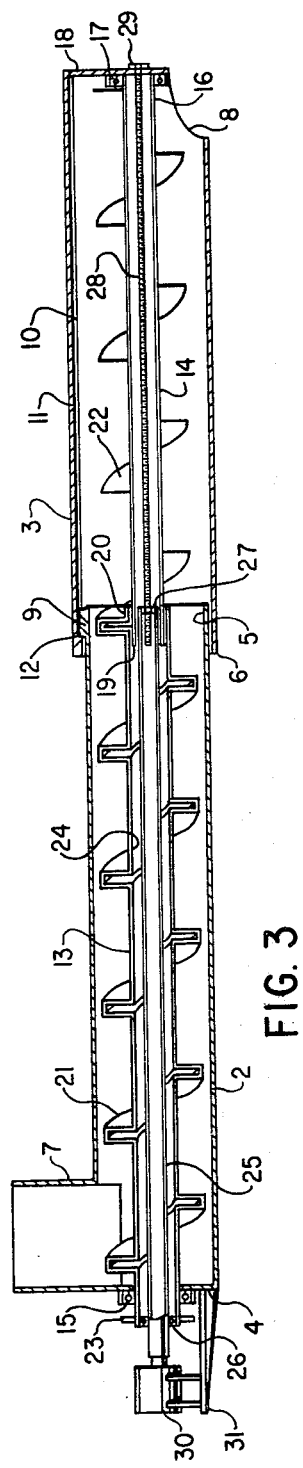

EXTENDABLE AUGER

FIELD OF THE INVENTION

This invention relates to an auger for granular material and in particular to an extensible grain auger.

Augers for granular material such as grain are quite common in the farm implement art. Extensible augers have long been available to the public. Such augers are disclosed, for example, by U.S. Pat. Nos. 2,290,806, issued to E. R. Hodgin on July 21, 1942; 2,292,934, issued to H. H. Fitch on Aug. 11, 1942; 2,443,288, issued to C. H. Anderson on June 15, 1948; 2,845,167, issued to B. J. Heiken on July 29, 1958; 3,015,258, issued to J. H. Apel et al on Jan. 2, 1962; 3,605,995, issued to N. N. Maack on Sept. 29, 1971 and 4,014,431, issued to E. Angeletti et al on Mar. 29, 1977.

A typical arrangement for changing the length of an auger is that disclosed by the Heiken U.S. Pat. No. 2,845,167. In the Heiken auger conveyor, one end of one auger meshes with one end of a second auger, i.e. the auger flights overlap. By rotating one auger relative to the other, the flights of the augers are caused to move into or out of overlapping relationship. Thus, the effective length of the auger or auger flight can be altered. The Heiken conveyor relies on a shaft having alternating square and round cross-sectional configurations which would present production problems. Moreover, in the Heiken conveyor, the auger flights overlap in a manner such that there is a non-continuous seam between the flights, i.e. between the overlapping portions of the shortened conveyor. Grain being fed through the auger can enter the crack possibly clogging the conveyor.

There exists a need for an auger for granular material which is structurally simple and which is not subject to clogging by the granular material. The object of the present invention is to provide such an auger.

BRIEF SUMMARY OF THE INVENTION

Accordingly, the invention relates to an extensible auger for granular material, the auger including first and second interconnected hollow shaft means; a hollow helical auger flight on the first shaft means opening into the interior of the first shaft means; a helical auger flight on the second shaft means extending into the first auger flight for movement into and out of the first auger flight between the retracted and extended positions; drive means in and separate from the first and second shaft means, for moving the first and second shaft means and auger flight between the extended and retracted positions.

In an alternative embodiment, the present invention relates to an extensible auger for granular material comprising a casing defined by first and second tubular sections slidably interconnected for movement between retracted and extended positions, each of said sections having a closed end and an open end; an inlet in a closed inner end of said first section for introducing granular material into the casing; an outlet in the closed outer end of said second section for discharging granular material from the casing; auger means in said casing for conveying granular material from said inlet to said outlet; said auger means including first and second interengaging hollow shaft means, one end of said first shaft means being rotatably mounted in said closed end of said first section and one end of said second shaft means being rotatably mounted in said closed end of said second section; a hollow, helical auger flight on said first shaft means opening into the interior of said first shaft means; a helical auger flight on said second shaft means extending into said first auger flight for movement into and out of said first auger flight between the retracted and extended positions; drive means in and separate from said first and second shaft means, and extending between the closed ends of said first and second sections for moving the sections, and consequently said first and second shaft means and auger flights between the extended and retracted positions.

BRIEF DESCRIPTION OF THE DRAWINGS

The invention will now be described in greater detail with reference to the accompanying drawing, which illustrate a preferred embodiment of the invention, and wherein;

FIG. 1 is an elevation view of an auger in accordance with present invention in the retracted position;

FIG. 2 is an elevation view of the auger of FIG. 1 in the extended position; and FIG. 3 is a longitudinal sectional view of the auger of FIGS. 1 and 2 in the extended position.

While FIG. 3 of the drawing is a sectional view, for the sake of simplicity some cross-hatching has been omitted from portions of the apparatus.

DESCRIPTION OF PREFERRED EMBODIMENT

With reference to the drawing, the auger of the present invention includes a casing generally indicated at 1 defined by a pair of telescopically interconnected tubes 2 and 3. The smaller tube 2 is closed at its inner end 4 (FIG. 3) and open at the outer end 5. The outer open end 5 of the tube 2 is slidable in open inner end 6 of the large diameter tube 3 for movement between the retracted position (FIG. 1) and the extended position (FIGS. 2 and 3).

An inlet duct 7 is provided on the inner closed end 4 of the tube 2 for introducing grain or the like into the auger casing 1. Grain is discharged from the casing 1 via an outlet opening 8 in the outer bottom end of the tube 3. The tubes 2 and 3 are slidably interconnected by a lug 9 on the top centre of the outer end of the inner tube 2 and a slot 10 in a longitudinally extending projection 11 on the top centre of the outer tube 3. The projection 11 extends the entire length of the tube 3. The inner end 12 of the slot 10 is closed to limit extension of the casing beyond the fully extended position (FIG. 3).

A pair of tubular auger shafts 13 and 14 are provided in the casing 1. The inner end of the larger shaft 13 is rotatably mounted in a bearing 15 on the inner, closed end 4 of the casing 2. Outer end 16 of the smaller shaft 14 is rotatably mounted in a bearing 17 in the outer, closed end 18 of the tube 3. The inner, free end 19 of the shaft 14 extends into the outer, free end 20 of the shaft 13.

The shaft 13 is provided with a hollow, helical auger flight 21, which opens into the interior of the shaft. One end of a solid, helical auger flight 22 extends into the outer end of the flight 21. A sprocket 23 is mounted on the end of the shaft 13 outside the tube 2 for driving the auger. With the length of the casing 1 fixed, rotation of the shaft 13 causes rotation of the shaft 14.

Seal means (not shown) may be provided such that granular material being moved through the casing 1 is prevented from passing into the hollow, helical auger flight 21. As will be appreciated, with the closed system shown, grain allowed to enter flight 21 could impede rotation and eventually cause seizure of the drive mechanism.

Alternatively, again as will be appreciated, the hollow helical auger flight 21 may be of open construction of similar configuration, without departing from the scope of the present invention. It is envisaged that flight 21 may be formed as a cage, or open framework it being only a requirement that the configuration is such that the frame of the auger flight remains such as to provide a guide within which the solid auger flight 22 may be threadably engaged. Thus, the word "hollow" when used in connection with flight 21 is to be construed to include such an open framework or cage construction.

The interconnected tubular auger shafts 13 and 14 define a continuous passage 24, which houses a drive for extending and retracting the casing 1, i.e. for moving the shaft 14 relative to the shaft 13. The drive includes a tube 25 extending from beyond one end of the shaft 13 to the other end thereof. The end of the tube 25 at the inlet end of the casing 1 is rotatably mounted in a bearing 26 in the shaft 13. A nut 27 mounted in the other end of the tube 25 supports one end of an elongated threaded rod 28. The other end of the rod 28 is fixedly mounted in an end plate 29 on the outer end 18 of the casing 1. When the tube 25 is rotated, the rod 28 moves into or out of the nut 27 and the tube 25 to change the length of the casing 1. At the same time, the auger flight 22 threads into or out of the flight 21. A motor 30 on a platform 31 at the inlet end of the casing 1 is used to turn the tube 25. The sprocket 23 is driven by a separate motor (not shown) for rotating the auger flights 21 and 22.

It will be appreciated that the drive for extending and retracting the casing 1 can be a hydraulic cylinder or the like.

The auger is transported in the retracted position (FIG. 1). In use, the tube 25 is rotated by means of the motor 30 to move the tube 3 outwardly, extending the casing 1. During extension or retraction of the auger casing, the lug 9 and the slot 10 in the projection 11 act as guides and at all times prevent rotation of one tube 2 relative to the other tube 3. As the casing sections 2 and 3 move together or apart, the auger flights 21 and 22 are free to rotate, because of the bearings 15 and 17. Thus, during extension or retraction of the auger, the auger flights rotate sufficiently to disengage or engage to a lesser or greater extent, the tube 25 and nut 27 rotate relative to the rod 28, and section 3 slides relative to casing section 2. When the casing has been extended to the desired length with the outlet opening 8 over a receiver (i.e. truck or receiving bin), the motor 30 is stopped. By connecting a motor (not shown) to the sprocket 23, the auger flights 21 and 22 are driven as a unit to feed grain from the inlet duct 7 to the outlet opening 8. Upon completion of a grain loading operation, the casing is retracted by reversing the direction of rotation of the drive shaft of the motor 30. Because the grain is fed from the larger to the smaller end of the auger flights, i.e. downstream away from the joint between the two auger flights, there is very little if any danger of grain being trapped between the flights.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example equivalent elements may be substituted for those illustrated and described herein, parts may be used independently of the use of other features, all as will be apparent to one skilled in the art after having the benefits of the description of the invention.

What I claim is:

1. An extensible auger for granular material, said auger including casing means and first and second interconnected hollow shaft means rotatable in said casing means; a hollow helical first auger flight on said first shaft means opening into the interior of said first shaft means; a helical second auger flight on said second shaft means extending into said first hollow auger flight between retracted and extended positions; first drive means positioned within and separate from said first and second shaft means, for moving said first and second shaft means and said auger flights between extended and retracted positioned, second drive means for rotating said first and second flights simultaneously in said casing means.

2. An extensible auger for granular material comprising a casing defined by first and second tubular sections slidably interconnected for movement between retracted and extended positions, each of said sections having a closed end and an open end; an inlet in a closed inner end of said first section for introducing granular material into the casing; an outlet in the closed outer end of said second section for discharging granular material from the casing; auger means in said casing for conveying granular material from said inlet to said outlet, said auger means including first and second interengaging hollow shaft means, one end of said first shaft means being rotatably mounted in said closed end of said first section and one end of said second shaft means being rotatably mounted in said closed end of said second section; a hollow helical first auger flight on said first shaft means opening into the interior of said first shaft means; a helical auger flight on said second shaft means extending into said first auger flight for movement into and out of said first auger flight between the retracted and extended positions; drive means positioned within and separate from said first and second shaft means, and extending between the closed ends of said first and second sections for moving the sections, and consequently said first and second shaft means and auger flights between the extended and retracted positions.

3. An auger according to claim 2, wherein said drive means includes a tube, one end of said tube being rotatably mounted in said first shaft means and extending outwardly beyond said closed inner end of said first section for connection to a source of power; a nut mounted in the other end of said tube; a threaded rod rotatably mounted in said second shaft means, said rod having one end engaging said nut and the other end fixedly connected to said outer closed end of said second section, whereby rotation of said tube causes movement of said threaded rod in said nut and consequently extension or retraction of said second casing section relative to said first casing section.

4. An auger according to claims 1, 2 or 3 wherein said first and second hollow shaft means are telescopically interconnected in a manner such that granular material is fed in a direction away from the junction between the shaft means during passage from said inlet to said outlet.

5. An auger according to claims 1, 2 or 3 wherein seal means are provided between said first and second hollow shaft means, such that granular material is prevented from passing into said hollow helical auger flight of said first shaft means during operation of said auger.

* * * * *